UNITED STATES PATENT OFFICE.

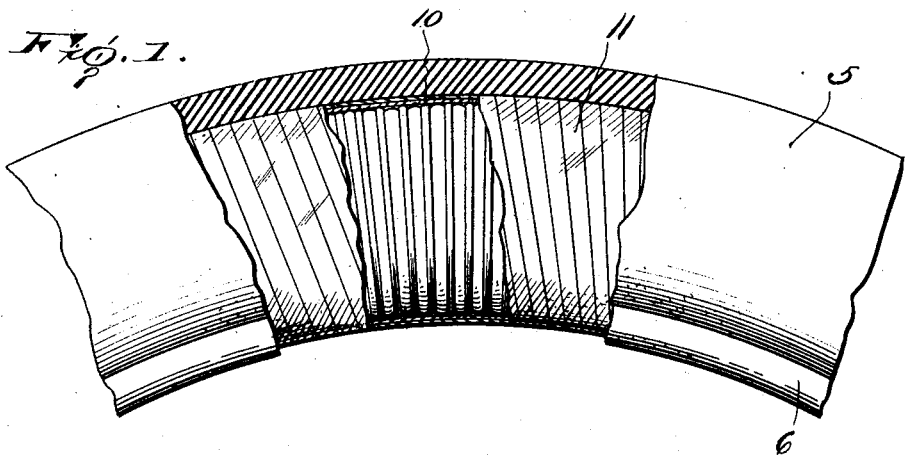
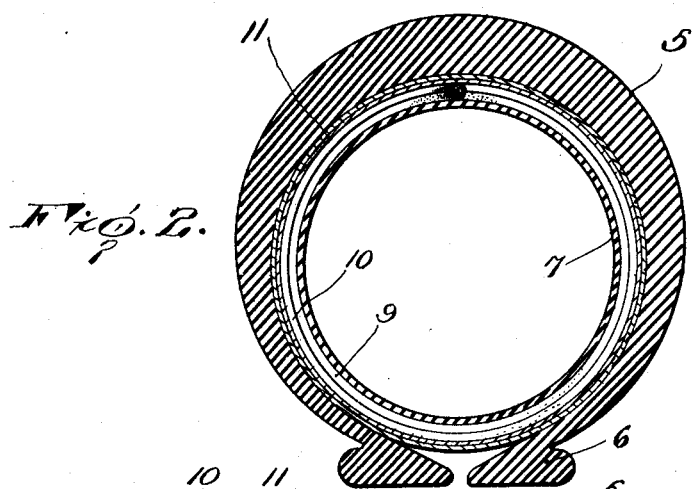
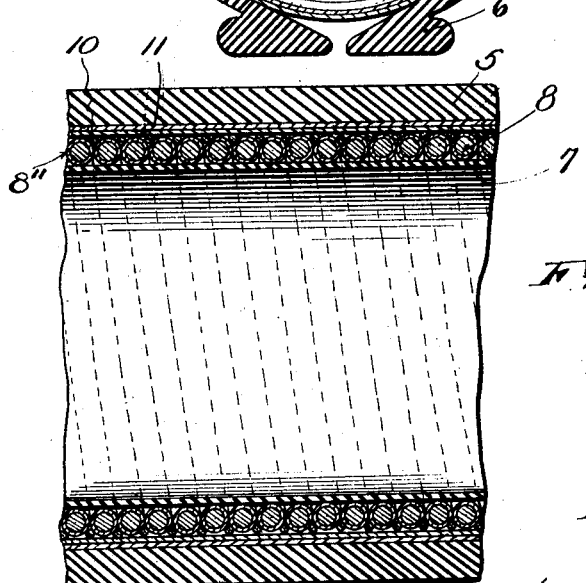

LELAND T. BAILEY, OF LYNCHBURG, VIRGINIA.

TIRE.

1,405,888. Specification of Letters Patent. Patented Feb. 7, 1922.

Application filed August 26, 1919. Serial No. 319,870.

*To all whom it may concern:*

Be it known that I, LELAND T. BAILEY, a citizen of the United States, residing at Lynchburg, in the county of Campbell and State of Virginia, have invented certain new and useful Improvements in Tires, of which the following is a specification.

This invention relates to improvements in resilient tires having novel cushioning means adapted to dispense with the necessity of employing compressed air as a cushioning medium.

An important object of the invention is to provide a resilient tire wherein the tube of the same is surrounded by a resilient metallic coil having its convolutions closely arranged and adapted to yieldably support the tire whereby the necessity of inflating the tube with air after it has been once assembled within the metallic coils is eliminated.

A further object of the invention is to provide a resilient tire of the so-called puncture proof type, which by reason of the non employment of compressed air as a cushioning medium will enable the tread of the tire to be used until worn completely through.

A further object of the invention is to provide a resilient tire of the character described which is simple, efficient, and desirable in use.

Other objects and advantages of the invention will be apparent during the course of the following description.

Figure 1 is a fragmentary side elevation partly in section of a resilient tire embodying my invention, Figure 2 is a transverse section through the same, Figure 3 is an enlarged fragmentary horizontal sectional view of Figure 2.

In the drawings wherein for the purpose of illustration is shown a preferred embodiment of my invention, the numeral 5 designates the casing or shoe of a tire which may be formed of laminated sheets of fabric and rubber or of any other desired material having the requisite wear resisting qualities. Annular beads 6 are formed in the inner sides of the casing 5 and are adapted to be arranged about a wheel rim in securing the tire to the rim. An annular tube 7 preferably of rubber is arranged within the shoe and is surrounded by an annular resilient supporting body 8 which in this case is an annular coil having its convolutions closely arranged for presenting a continuous surface to the tube 7. The coil 8 is formed of round flexible wire provided with a covering 8'' of cloth or rubber to prevent the individual convolutions of the wire from biting and cutting into the tube 7. The helical recesses formed in the outer sides of the resilient supporting body by arranging the convolutions of the wire closely together are filled by a cord 10 of any suitable material. The cord 10 which is tightly wound in annular formation to wedge between and uniformly fill the helical recesses in the outer side of the resilient supporting body presents a smooth outer surface for preventing the outer sides of individual convolutions from cutting through a fabric covering 11. The fabric covering 11 is formed from a narrow length of fabric wound about the outer side of the resilient supporting body with its longitudinal edges overlapped. As illustrated in Fig. 3 the fabric covering 11 may be wound about the resilient supporting body 8 a sufficient number of times to provide the necessary thickness between the tube 7 and the casing.

With reference to the foregoing description taken in connection with the accompanying drawing it will be noted that a tire constructed in accordance with this invention is not susceptible to punctures from tacks, etc.

By the non-employment of compressed air for re-inflating the inner tube the casing 5 may be worn completely through and the life of the tire is therefore greatly prolonged.

It is to be understood that the form of the invention herewith shown and described is to be taken as a preferred embodiment of the same and that such minor changes may be made as will remain within the spirit of the invention and the scope of what is claimed.

Having thus described the invention, what is claimed as new is:

1. In a tire, the combination of a casing enclosing a resilient, annular member formed of a covered wire helically coiled, and having the convolutions thereof closely arranged, a cord coiled in the external groove formed by the convolutions of the wire, whereby a substantially smooth peripheral bearing surface is formed, the cord acting as a wedge between said convolutions, an overlapping wearing member helically wrapped around said peripheral bearing surface and an inner tube fitting tightly within the convolutions of said member.

2. In a tire, the combination with an inner tube of a flexible wire closely wound around said tube and provided with a covering, a cord filling the external groove formed between the convolutions of said flexible wire, a narrow strip of fabric wound with overlapping edges around the convolutions of both wire and cord, and a shoe, having wear resisting qualities, surrounding the entire structure.

In testimony whereof I affix my signature.

LELAND T. BAILEY. [L. S.]